(12) United States Patent
Tsutsumi et al.

(10) Patent No.: US 6,175,799 B1
(45) Date of Patent: Jan. 16, 2001

(54) APPARATUS AND METHOD FOR AUTOMATICALLY CONTROLLING VEHICULAR VELOCITY

(75) Inventors: Junji Tsutsumi; Akira Higashimata; Hideo Iwamoto, all of Kanagawa (JP)

(73) Assignee: Nissan Motor Co., Ltd., Kanagawa (JP)

( * ) Notice: Under 35 U.S.C. 154(b), the term of this patent shall be extended for 0 days.

(21) Appl. No.: 09/303,626

(22) Filed: May 3, 1999

(30) Foreign Application Priority Data

May 1, 1998 (JP) ................................................ 10-122182

(51) Int. Cl.[7] ................................ G05D 1/00; G06F 7/00; G06F 19/00
(52) U.S. Cl. ............................ 701/96; 701/93; 701/300; 342/70; 340/903; 340/904
(58) Field of Search ............................. 701/96, 301, 300, 701/93; 340/904, 903; 342/70

(56) References Cited

U.S. PATENT DOCUMENTS

| | | | |
|---|---|---|---|
| 5,161,632 | * 11/1992 | Asayama | 180/167 |
| 5,396,426 | * 3/1995 | Hibino et al. | 701/96 |
| 5,710,565 | 1/1998 | Shirai et al. | |
| 5,771,007 | * 6/1998 | Arai et al. | 340/903 |
| 5,934,399 | * 8/1999 | Iiboshi et al. | 180/169 |
| 6,044,321 | * 3/2000 | Nakamura et al. | 701/96 |

FOREIGN PATENT DOCUMENTS 7-47864    2/1995   (JP) .

* cited by examiner

Primary Examiner—William A. Cuchlinski, Jr.
Assistant Examiner—Olga Hernandez
(74) Attorney, Agent, or Firm—McDermott, Will & Emery (57) ABSTRACT

In apparatus and method for controlling a vehicular velocity for an automotive vehicle, a vehicular velocity and an inter-vehicle distance from the vehicle to another vehicle which is running ahead of the vehicle are detected, a lateral acceleration imposed on a vehicle body of the vehicle which is generally developed when the vehicle is running on a curved road is detected, a target value of the vehicular velocity of the vehicle according to which a detected value of the inter-vehicle distance is made equal to value of a target inter-vehicle distance is calculated, a correction is made on the calculated value of the target vehicular velocity according to a detected value (magnitude) of the lateral acceleration (lateral G), the vehicular velocity of the vehicle is controlled in such a manner that the detected value of the vehicular velocity is made equal to the corrected target vehicular velocity.

18 Claims, 8 Drawing Sheets

APPARATUS AND METHOD FOR AUTOMATICALLY CONTROLLING VEHICULAR VELOCITY

BACKGROUND OF THE INVENTION a) Field of the Invention

The present invention relates to apparatus and method for automatically controlling a vehicular velocity for an automotive vehicle so as to make the vehicular velocity substantially equal to a target vehicular velocity in order to follow up a preceding vehicle which is running ahead of the vehicle, maintaining at a constant inter-vehicle distance from the vehicle to the preceding vehicle.

b) Description of the Related Art

A Japanese Patent Application First Publication No. Heisei 7-47864 published on Feb. 21, 1995 exemplifies a previously proposed inter-vehicle distance controlling apparatus. In the previously proposed inter-vehicle distance controlling apparatus, a safe inter-vehicle distance from the vehicle to another vehicle traveling ahead of the vehicle (also called, a preceding vehicle) is determined with a road surface situation and a vehicular running condition taken into consideration and a vehicular engine output is controlled so that an actual inter-vehicle distance is made coincident with the safe inter-vehicle distance.

SUMMARY OF THE INVENTION

However, since, in the previously proposed inter-vehicle distance controlling apparatus, the safe inter-vehicle distance is determined and the vehicular engine output is controlled so that the actual inter-vehicle distance is made coincident with the safe inter-vehicle distance even if the vehicle is running a curved road having an radius of curvature, in a steady state, the vehicle is resulted in running at the same velocity as the preceding vehicle. Hence, there is no guarantee that the vehicular velocity of the preceding vehicle is not always a safe vehicular velocity during the run of the vehicle and the preceding vehicle on the curved road. The vehicular velocity of the preceding vehicle tends to be too fast for a vehicular occupant(s).

It is therefore an object of the present invention to provide apparatus and method for automatically controlling a vehicular velocity for an automotive vehicle which can follow up the preceding vehicle at a safe vehicular velocity when the vehicle and the preceding vehicle are running on a curved road.

The above-described object can be achieved by providing a control apparatus for an automotive vehicle, comprising: a vehicular velocity detector detecting a vehicular velocity; an inter-vehicle distance detector detecting an inter-vehicle distance from the vehicle to another vehicle which is running ahead of the vehicle; a target vehicular velocity calculator calculating a target value of the vehicular velocity according to which a detected value of the inter-vehicle distance is made coincident with a target value of the inter-vehicle distance; a vehicular velocity controller, the vehicular velocity controller being responsive to the calculated target value of the vehicular velocity and generating and outputting an actuation command to control the vehicular velocity in such a manner that the detected value of the vehicular velocity is made coincident with the calculated target value of the vehicular velocity; a vehicular velocity variation actuator, the vehicular velocity variation actuator being responsive to the actuation command from the vehicular velocity controller, actuating the vehicle to vary the vehicular velocity so that the detected value of the vehicular velocity is made coincident with the calculated target value of the vehicular velocity; a lateral acceleration detector detecting a lateral acceleration imposed on a vehicle body; and a target vehicular velocity corrector, the target vehicular velocity corrector being responsive to a detected value of the lateral acceleration and correcting the calculated target value of the vehicular velocity according to the detected value of the lateral acceleration.

The above-described object can also be achieved by providing a method for controlling a vehicular velocity for an automotive vehicle, comprising: detecting a vehicular velocity; detecting an inter-vehicle distance from the vehicle to another vehicle which is running ahead of the vehicle; detecting a lateral acceleration imposed on a vehicle body of the vehicle; calculating a target vehicular velocity of the vehicle according to which a detected value of the inter-vehicle distance is made coincident with a target value of the inter-vehicle distance; correcting the calculated target value of the vehicular velocity according to a detected value of the lateral acceleration; controlling the vehicular velocity of the vehicle in such a manner that the detected value of the vehicular velocity is made coincident with the corrected target value of the vehicular velocity; generating an actuation command, the actuation command being responded to the corrected target value of the vehicular velocity; and actuating the vehicle to vary the vehicular velocity to make the detected value of the vehicular velocity coincident with the corrected target value of the vehicular velocity.

DETAILED DESCRIPTION OF THE PREFERRED EMBODIMENT

Reference will hereinafter be made to the drawings in order to facilitate a better understanding of the present invention.

Figure 1A:
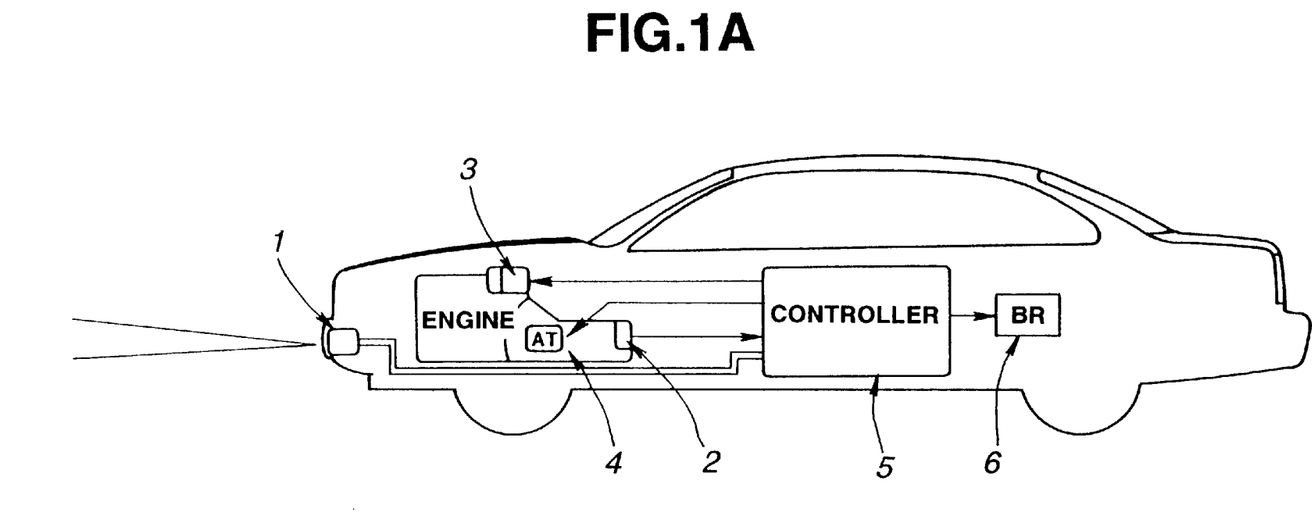
FIG. 1A is a simplified explanatory view of an automotive vehicle to which an apparatus for automatically controlling a vehicular velocity in a preferred embodiment of the present invention is applicable.

FIG. 1A shows an explanatory view of an automotive vehicle (viz., system vehicle) to which the apparatus for controlling an inter-vehicle distance to a preceding vehicle traveling ahead of the vehicle in a preferred embodiment according to the present invention is applicable.

In FIG. 1A, an inter-vehicle distance sensor (head) 1 is a sensor head of a radar type such that a laser beam is scanned over a given scanning angle in a width-wise direction of the vehicle and the reflected beams are received from an object (s) present in, generally, a forward detection zone defined by the scanning angle to detect the object(s), e.g., a preceding vehicle. It is noted that an electromagnetic wave or ultrasonic wave may be used in place of the laser beam. The inter-vehicle distance sensor 1 is exemplified by a U.S. Pat. No. 5,710,565 (issued on Jan. 24, 1998)(the disclosure of which is herein incorporated by reference).

A vehicular velocity sensor 2 is attached on an output shaft of an automatic transmission 4 to output a pulse train signal whose period is in accordance with a revolution velocity of the output shaft of the automatic transmission 4. The revolution velocity of the output shaft of the automatic transmission is deemed to be the vechicular velocity.

A throttle valve position actuator 3 (constituted, for example, by a DC motor) actuates a throttle valve of an engine associated with the automatic transmission 4 to be opened or closed in response to a throttle valve opening angle command so as to vary an intake air quantity in an intake air passage of the engine to be supplied to the engine to adjust an engine output torque.

The automatic transmission 4 varies a gear ratio thereof in accordance with the vehicle velocity and the engine output torque described above.

A brake system 6 serves to develop a braking force to be applied to the vehicle shown in FIG. 1A.

Figure 1B:
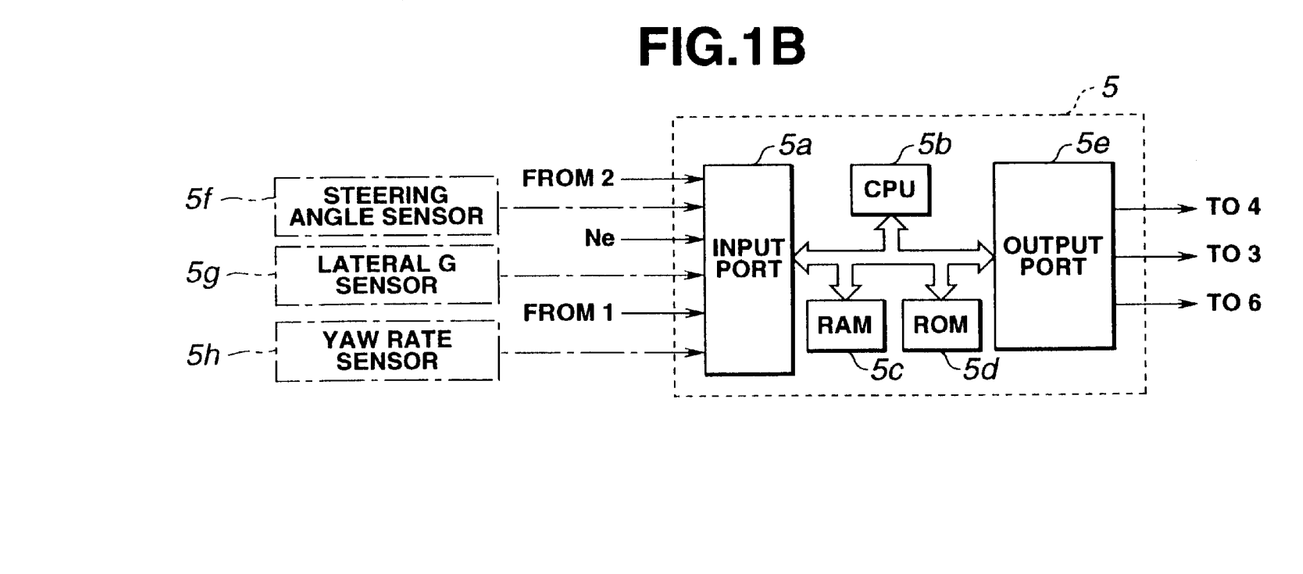
FIG. 1B is a circuit block diagram of a controller shown in FIG. 1A.

An inter-vehicle distance controller 5 includes a microcomputer and its peripheral parts, as shown in FIG. 1B.

The microcomputer of the controller 5 includes a CPU (Central Processing Unit), a RAM (Random Access Memory), a ROM (Read Only Memory), an Input Port, an Output Port, and a common bus, as shown in FIG. 1B.

The inter-vehicle distance controller 5 calculates a target vehicular velocity on the basis-of a detected value of the inter-vehicle distance and a detected value of the vehicular velocity and controls an operation of the throttle valve position actuator 3, a gear ratio of the automatic transmission 4, and a braking liquid pressure in the brake system 6. The inter-vehicle distance controller 5 constitutes control blocks 11, 21, 50, and 51 shown in FIG. 2A in terms of software. The details of the function of the inter-vehicle distance controller 5 will be described later.

Figure 2A:
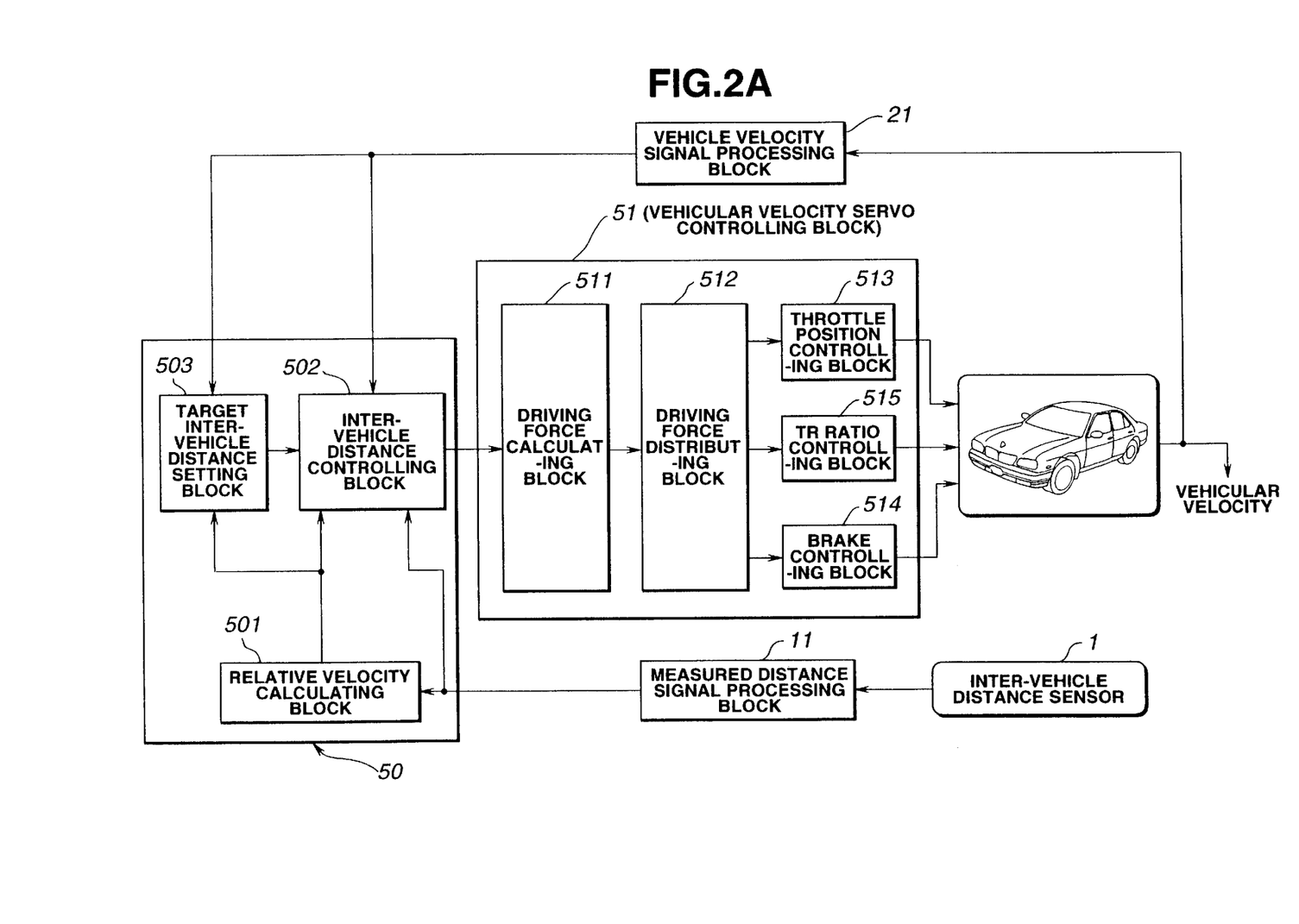
FIG. 2A is a functional block diagram of the controller and its peripheral circuit of the automatic vehicular velocity controlling apparatus shown in FIG. 1A.

FIG. 2A shows the functional block diagram of the inter-vehicle distance controller 5 in the preferred embodiment according to the present invention.

In FIG. 2A, a measured distance signal processing block 11 measures a time duration from a time at which the laser beam is radiated to scan a detection zone from the inter-vehicle distance sensor 1 to a time at which the reflected laser beam to calculate the inter-vehicle (spatial) distance from the vehicle in which the apparatus shown in FIG. 1A is installed to another vehicle (also called, a preceding vehicle) which is traveling ahead of the vehicle.

It is noted that if a plurality of such preceding vehicles as described above are trapped by the inter-vehicle distance sensor 1, one of the preceding vehicles to be followed is specified and its inter-vehicle distance to be specified preceding vehicle is calculated.

Since a method of selecting the specified one of the preceding vehicle is well known, the detailed description thereof will herein be omitted. It is noted that the selection method is exemplified by the U.S. Pat. No. 5,710,565 issued on Jan. 20, 1998 (the disclosure of which is herein incorporated by reference).

A vehicular velocity signal processing block 21 measures a period of the vehicular velocity pulses from the vehicular velocity sensor 2 to derive the velocity of the vehicle.

In addition, as shown in FIG. 2A, a preceding vehicle follow-up controlling block 50 includes: a relative velocity controlling block 501; an inter-vehicle distance controlling block 502; and a target inter-vehicle distance setting block 503.

The preceding vehicle follow-up controlling block 50 calculates a target inter-vehicle distance and a target vehicular velocity on the basis of the detected values of the inter-vehicle distance and of the vehicular velocity.

The relative velocity calculating block 501 calculates a relative velocity between the vehicle and the preceding vehicle on the basis of the detected value of the inter-vehicle distance by the measured distance signal processing block 11.

The inter-vehicle distance controlling block 502 calculates the target vehicular velocity to make the inter-vehicle distance equal to the target inter-vehicle distance with the relative velocity in mind.

The target inter-vehicle distance setting block 503 sets the target inter-vehicle distance according to the vehicular velocity of the preceding vehicle or the vehicular velocity of the vehicle itself.

Furthermore, a vehicular velocity servo controlling block 51 controls a throttle valve angular position of an engine throttle valve through the throttle valve position actuator 3, the gear ratio of the automatic transmission 4, and/or the braking force of the braking system 6 in such a manner that the detected vehicular velocity (V) is made coincident with the target vehicular velocity (V*).

As shown in FIG. 2A, the vehicular velocity servo controlling block 51 includes: a driving force calculating block 511 for calculating a driving force (including a braking force) exerted by the vehicle on the basis of the input target vehicular velocity from the preceding vehicle follow-up controlling block 50; a driving force distributing block 512 for distributing the calculated driving force to be exerted by the vehicle into one of the engine throttle position actuator (the throttle position controlling block) 513; a gear ratio controlling block (transmission (tr) ratio controlling block) 515 for the automatic transmission 4, and a brake controlling block 514 for the brake system 6.

Figure 2B:
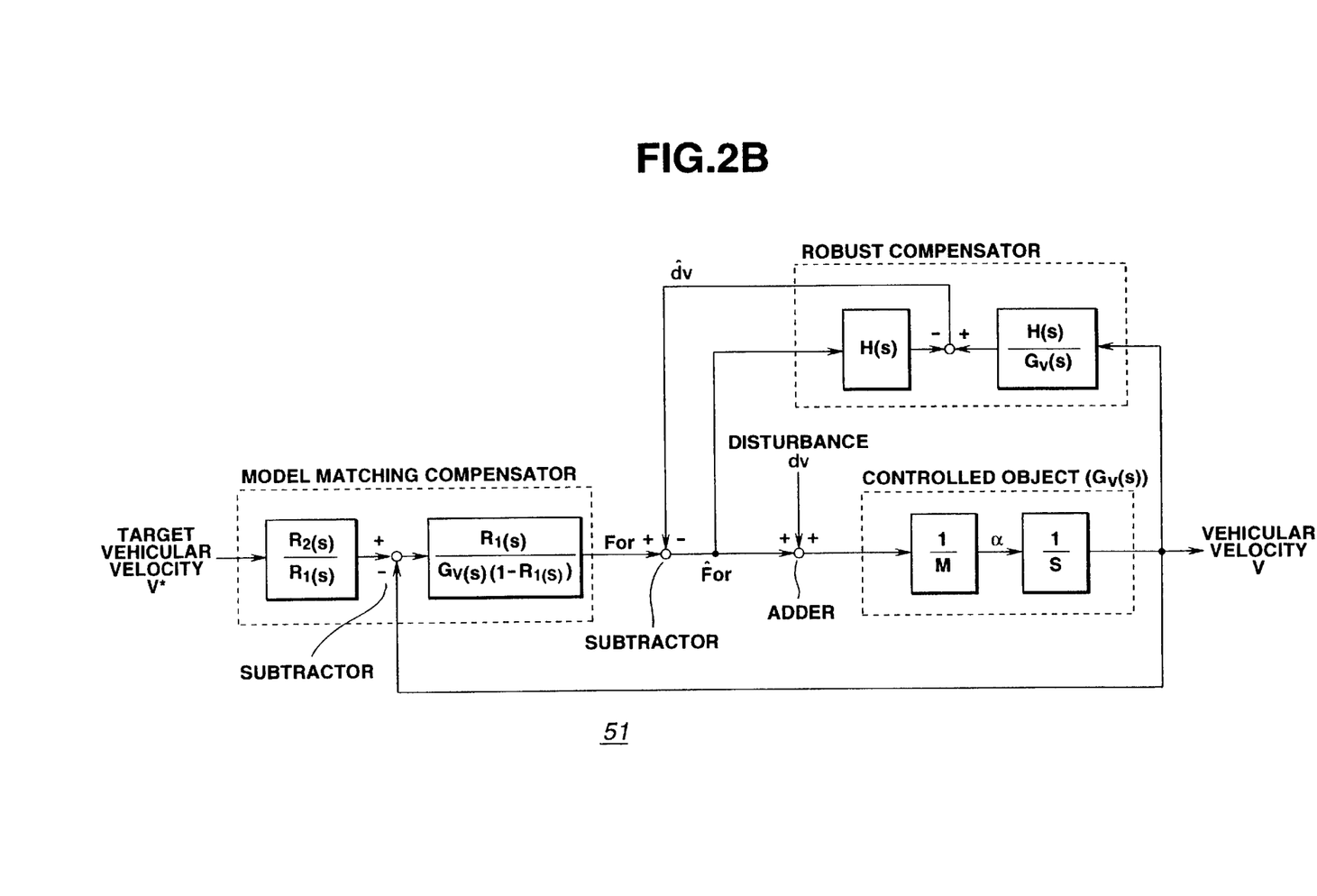
FIGS. 2B and 2C are respective functional block diagrams of an example of a vehicular velocity servo controlling block shown in FIG. 2A.

FIG. 2B exemplifies a control block diagram of the vehicular velocity servo controlling block 51 shown in FIG. 2A.

The vehicular velocity servo controlling block 51 is designed using a robust model matching control technique, the vehicular velocity servo controlling block 51 being constituted by, e.g., a robust compensator which serves as a disturbance estimator and a model matching compensator which makes the whole response characteristic of the vehicular velocity servo controlling block 50 equal to a response characteristic of a normal (standard) model, in order for the vehicular velocity controlling block 51 to provide a robust control system to such a variation in a road surface gradient.

The robust compensator estimates and compensates for such external disturbances as a modeling error of a controlled object (viz., the vehicle) and a running resistance of the controlled object so that the vehicular velocity servo controlling block 51 can be constituted by a control system in which an actual characteristic is made coincident with a linear model Gv(s).

In FIG. 2B, H(s) denotes a robust filter determining an external disturbance elimination performance and is expressed as in an equation (a) of TABLE 1.

In addition, in FIG. 2B, the model matching compensator determines the response characteristic on input and output by means of a normal model R2(s) in a feedforward section and determines the external disturbance elimination performance and a stability by means of a normal model R1(s) in a feedback section.

For example, the model matching compensator is constituted by two first-order lag low-pass filters as expressed in equations (b) and (c) of TABLE 1.

It is noted that s denotes a Laplace transform operator in each of the equations, (a), (b), and (c) of TABLE 1 and $\tau c$, T1, and T2 denotes time constants.

The linear approximation model Gv(s) of the vehicle which is the controlled object gives an integration characteristic as expressed in an equation (d) of TABLE 1.

From the above description, the target driving force For-hat (For^) can be derived as expressed in equations (e) and (f) of TABLE 1.

In the equations (d), (e), and (f), M denotes a constant, V* denotes the target vehicular velocity, and V denotes the detected vehicular velocity.

Figure 2C:
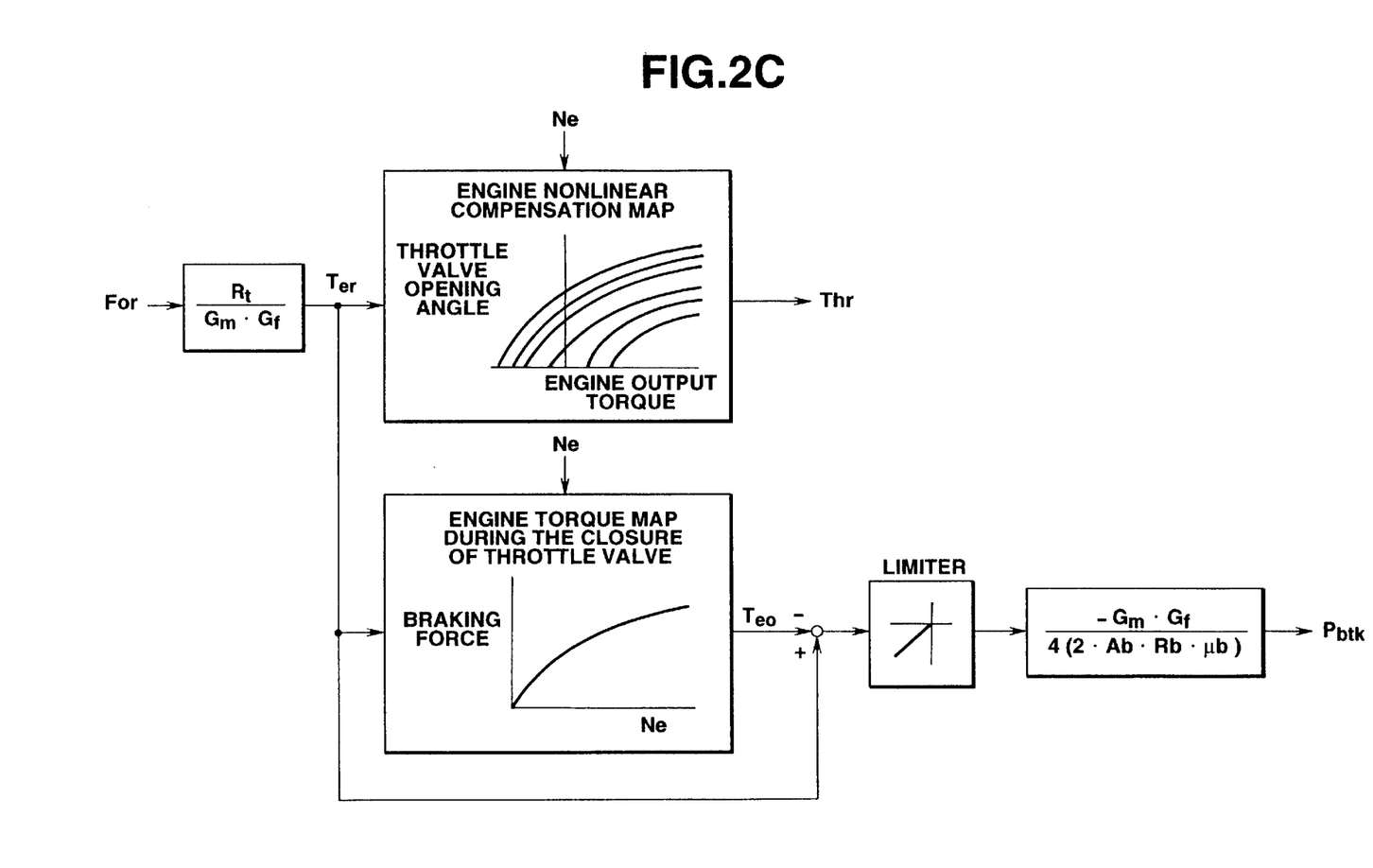

A method of calculating command values on the throttle valve angular position (opening angle) and on a braking liquid pressure in the brake system 6 from the target driving force calculated in accordance with the equations (e) and (f) of TABLE 1 is achieved by the structure, e.g., shown in FIG. 2C.

First, a torque command value Ter is derived by transforming the target driving force For^ thereinto using an equation (g) of TABLE 1.

In the equation (g), Rt denotes an effective radius of each road wheel of the vehicle, Gm denotes a gear ratio of the automatic transmission 4 of the vehicle, and Gf denotes a final gear ratio.

In the throttle position control, the command value on the throttle valve angular position is derived from the torque command value Ter and an engine speed Ne using a non-linear compensation map (shown in FIG. 2C) on the throttle valve opening angle with respect to a previously stored engine output torque as shown in FIG. 2C. Then, the throttle position controlling block 513 drivingly controls the throttle valve actuator 3.

On the other hand, in the brake control, the command on the braking liquid pressure is supplied to the brake controlling block 514 when the command value on the throttle valve opening angle indicates zero, i.e., when the throttle valve is fully closed.

The brake controlling block 514 drivingly controls the brake system 6 in response to the command on the braking liquid pressure. The braking liquid pressure command value is calculated by deriving a torque TeO when the throttle valve is completely closed from a map (shown in FIG. 2C) of a previously stored engine output torque during the complete closure of the throttle valve with respect to the engine speed Ne and subtracting the torque TeO from the calculated torque value Ter when the throttle valve opening angle command value is zero.

That is to say, the braking liquid pressure command value Pbrk is derived as expressed in an equation (h) of TABLE 1.

In the equation (h), Ab denotes an area of each wheel cylinder of the vehicle, Rb denotes an effective radius of each braking disc of the vehicle, and $\mu b$ denotes a friction coefficient of a braking disc pad.

It is noted that, although not shown in FIG. 2C, the transmission gear ratio shift controlling block 515 issues a down-shift command or an up-shift command to the automatic transmission 4 according to the throttle valve opening angle and the vehicular velocity V.

In the preferred embodiment, a vehicular velocity correction variable is calculated according to a magnitude of the lateral acceleration (also called, lateral G) developed on a vehicle body of the vehicle during a vehicular run on a curved road and a vehicular velocity command value (which corresponds to the target value of the vehicular velocity) is corrected according to the value of the correction variable.

Hence, the inter-vehicle distance controller 5 controls the vehicular velocity so that the vehicle can run at a safer velocity during a run of the curved road having a radius of curvature.

First, explained herein will be a method of deriving the vehicular velocity command value Vsp_Comn which corresponds to the target vehicular velocity V*.

The preceding vehicle follow-up controlling block 50 calculates the target vehicular velocity Ac_Vcomo being calculated from a selection result between a control target vehicular velocity Acc_Como calculated by the preceding vehicle follow-up control block 50 shown in FIG. 2A and a set vehicular velocity (upper) limit value Vsp_Como preset by a vehicular occupant (the set vehicular velocity limit value above which the preceding vehicle follow-up control becomes ineffective). That is to say, the target vehicular velocity Ac_Vcomo is calculated in such a manner that one of the two values of the control target vehicular velocity Acc_Como and the set vehicular velocity Vsp_Como which is smaller than the other is selected. This selection is expressed as follows:

$$Ac\_Vcomo = \min \{Vsp\_Como, Acc\_Como\} \quad (1).$$

In this embodiment, the control period is 10 milliseconds (ms).

It is noted that a value in which a vehicular velocity variation rate limits in an acceleration direction of 0.06 G (G denotes a gravitational acceleration $\approx 9.8$ m/sec$^2$) and in a deceleration direction of $-0.13$G are provided toward the target vehicular velocity Ac_Vcomo gives the (final) vehicular velocity command value Vsp_Comn.

The vehicular velocity command value Vsp_Comn is calculated as in the following equations.

① If Vsp_Como (prior to one control period)<Ac_Vcomo, a case wherein the vehicle is accelerated at 0.021 km/h (=LMT (+)) during 10 milliseconds of the control period) corresponds to 0.06 G (0.06 G means a designed value without a feeling of difference for the vehicular occupant(s) during the vehicular acceleration). Hence, Vsp_Comn=min {Vsp_Comn (prior to one control period)+ 0.021 Km/h, Ac_Vcomo} - - - (2);

② If Vsp_Comn (prior to one control period)=Ac_Vcomo, Vsp_Comn=Vsp_Comn (prior to one period) (3); and ③ If Vsp_Comn (prior to one control period)>Ac_Vcomo, a case where the vehicle is decelerated at 0.046 Km/h (=LMT(−)) for 10 milliseconds corresponds to −0.13 G (−0.13G means a designed value with the deceleration of the preceding vehicle in mind).

Hence, Vsp_Comn=max {Vsp_Comn (prior to one control period)−0.046 Km/h (LMT(−)),Ac_Vcomo} - - - (4).

According to the above calculations, the vehicular velocity command value Vsp_Comn is directed toward the target vehicular velocity Ac_Vcomo within a range from 0.06 G at the acceleration side to −0.13 G at the acceleration side. The actual vehicular velocity is controlled to become coincident with the vehicular velocity command value Vsp_Comn.

Figure 3:
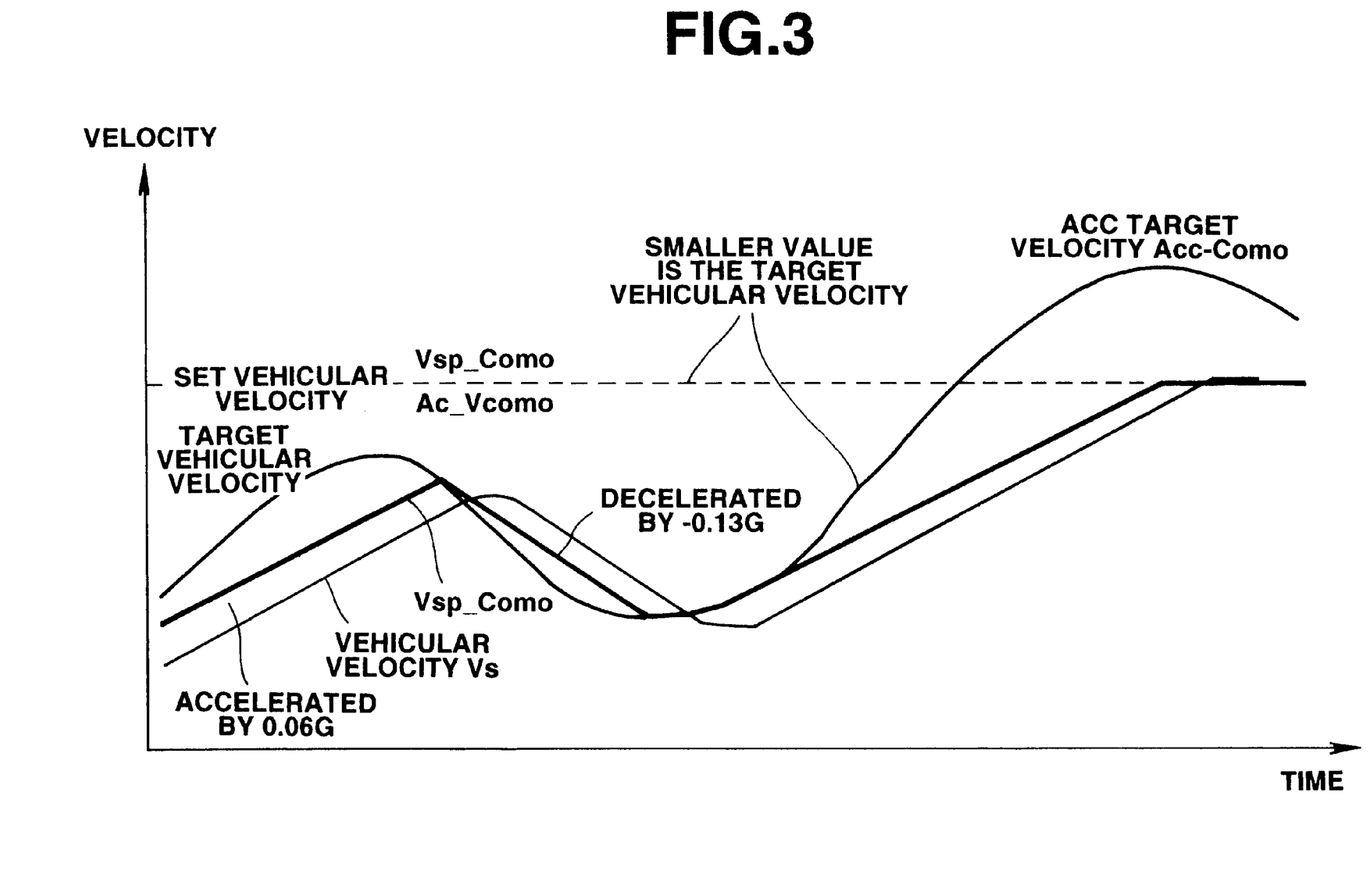
FIG. 3 is a characteristic graph representing a lateral acceleration and a target value of a vehicular velocity for explaining an operation of the preferred embodiment of the automatic vehicular velocity controlling apparatus shown in FIG. 1A.

FIG. 3 shows a graph representing a relationship between Vsp_Como, Ac_Vcomo, and Acc_Como.

Next, a method of correcting the vehicular velocity command value Vsp_Comn according to the magnitude of the lateral G will be described below.

The vehicular velocity correction variable Comn_Sub to correct the vehicular velocity command value Vsp_Comn according to the lateral G is calculated by the inter-vehicle distance controller 5.

With the vehicular velocity correction variable Comn_Sub in mind, the corrected vehicular velocity command value Vsp_Comh is, then, calculated.

First, the vehicular velocity correction variable Comn_Sub is calculated with a correction coefficient determined according to a lateral G multiplied by the predetermined variation rate limit value (LMT(+)), i.e., 0.021 Km/h in the acceleration side.

Comn_Sub=(correction coefficient)*0.021 Km/h - - - (5).

Figure 4:
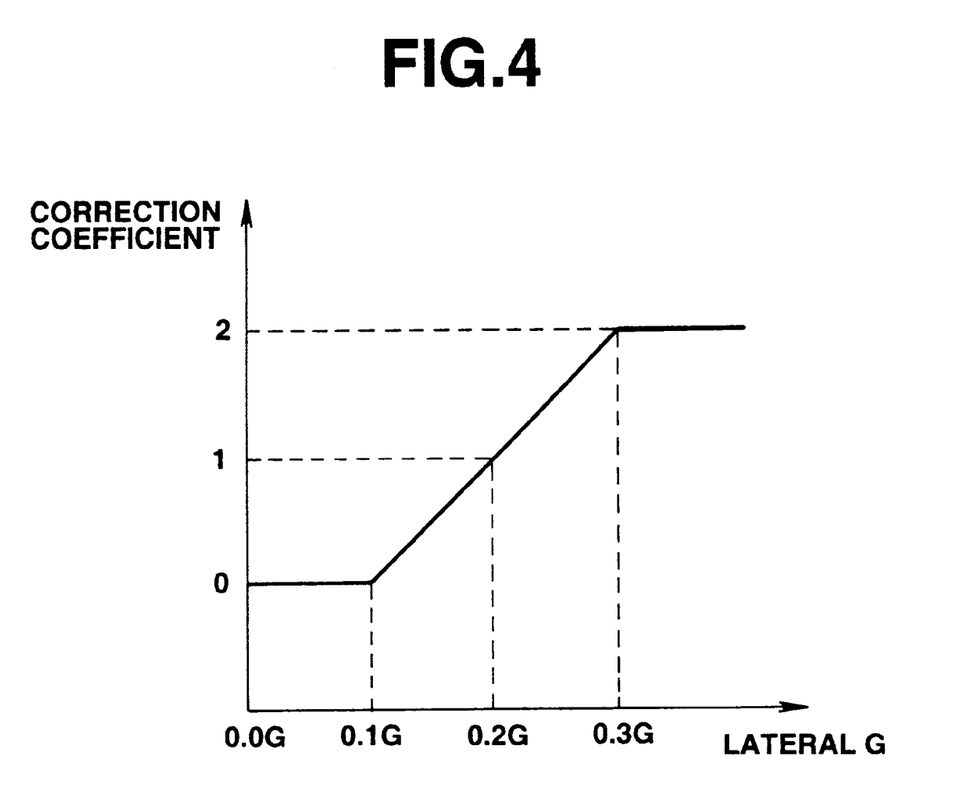
FIG. 4 is a table map representing a relationship between a detected value of the lateral acceleration and a correction coefficient.

The magnitude of the correction coefficient becomes large as the lateral acceleration becomes large as shown in FIG. 4.

This is because as the lateral G becomes large, a large correction variable is incorporated in the variation in the vehicular velocity command value Vsp_Comn.

FIG. 4 shows a map representing the correction coefficient with respect to the magnitude of the lateral G set on the basis of an experiment result using the vehicle in which the vehicular velocity controlling apparatus was installed and which was running on a freeway.

As shown in FIG. 4, when the lateral acceleration is equal to or below 0.1G, the correction coefficient gives zero determining that no correction for the vehicular velocity command value is needed. Furthermore, when the lateral acceleration is equal to or larger than 0.3G, such a value as equal to or larger than 0.3 G does not usually occur when the vehicle runs under a normal condition. In addition, in order to prevent the correction variable from becoming excessively large when the detected value of the lateral acceleration becomes erroneously large, the correction coefficient is set to be constant as shown in FIG. 4 when the lateral acceleration becomes equal to or larger than 0.3 G.

Then, the lateral G corrected vehicular velocity command value Vsp_Comh is calculated as follows:

The following equations are additions of subtraction parts of the vehicular velocity correction variable Comn_Sub into the above-described equations (2) through (4) on the vehicular velocity command value Vsp_Comn.

①' If Vsp_Comh (prior to one control period)<Ac_Vcomo, Vsp_Comh=min {Comn_Sub+0.021 Km/h (LMT(+)), Ac_Vcomo} - - - (6);

②' If Vsp_Comh (prior to one control period)=Ac_Vcomo, Vsp_Comh=Vsp_Comh (prior to one control period)−Comn_Sub - - - (7); and ③' Vsp_Comh (prior to one control period)>Ac_Vcomo, Vsp_Comh=max {Vsp_Comh (prior to one control period)−Comn_Sub−0.046 Km/h (LMT(−)), Ac_Vcomo} - - - (8).

An operation of the preferred embodiment of the vehicular velocity controlling apparatus when ①' Vsp_Comh (prior to one period)<Ac_Vcomo will be described below.

In a case where the lateral G is equal to or below 0.1 G, the correction coefficient is zeroed. Hence, since the vehicular velocity correction variable Comn_Sub indicates zero, the predetermined acceleration variation limitvalue, i.e., 0.021 Km/h(LMT(+))is added to Vsp_Comh. If the lateral G is 0.2 G, the correction coefficient gives 1 so that the vehicular velocity correction variable Comn_Sub to subtract Vsp_Comh becomes equal to the predetermined variation rate limit value LMT(+) on the vehicular acceleration direction (viz., 0.021 Km/h) to be added to Vsp_Comh and no change in the vehicular velocity command value Vsp_Comh occurs.

That is to say, even when the acceleration command is in the vehicular velocity command value, the vehicular velocity is maintained. If the lateral G is larger than 0.2 G. the correction coefficient becomes larger than 1. Hence, the vehicular velocity correction variable Comn_Sub becomes larger than the variation rate (acceleration) limit value of 0.021 Km/h (LMT(+)). Hence, the vehicular velocity command value Vsp_Comh becomes smaller than one control period prior to Vsp_Comh.

That is to say, since the magnitude of the lateral G is large, the acceleration command would often be change to a deceleration command.

②' If Vsp_Comh (prior to one control period)=Ac_Vcomo and since, for example, the vehicle is running solely at the set vehicular velocity Vsp_Como with no presence of the preceding vehicle, the correction is made for the vehicular velocity command value Vsp_Comb due to the development of the lateral G on the vehicle body. At this time, the subtraction of Vsp_Comb from the vehicular velocity command value Vsp_Comb is carried out.

That is to say, even if the vehicle is running at a constant vehicular velocity, the vehicular velocity command value becomes the deceleration command to approach to the safer vehicular velocity when the lateral acceleration (G) becomes large. ③' If Vsp_Comh (prior to one control period)>Ac_Vcomo, the vehicular velocity command value indicates the deceleration command. However, in order to further make the subtraction of the vehicular velocity correction variable Comn_Sub, the command value indicates a larger acceleration command.

However, since, actually, the vehicular velocity has already been reduced according to the vehicular deceleration command, an effect of the deceleration due to the presence of the lateral G becomes reduced.

Figure 5:
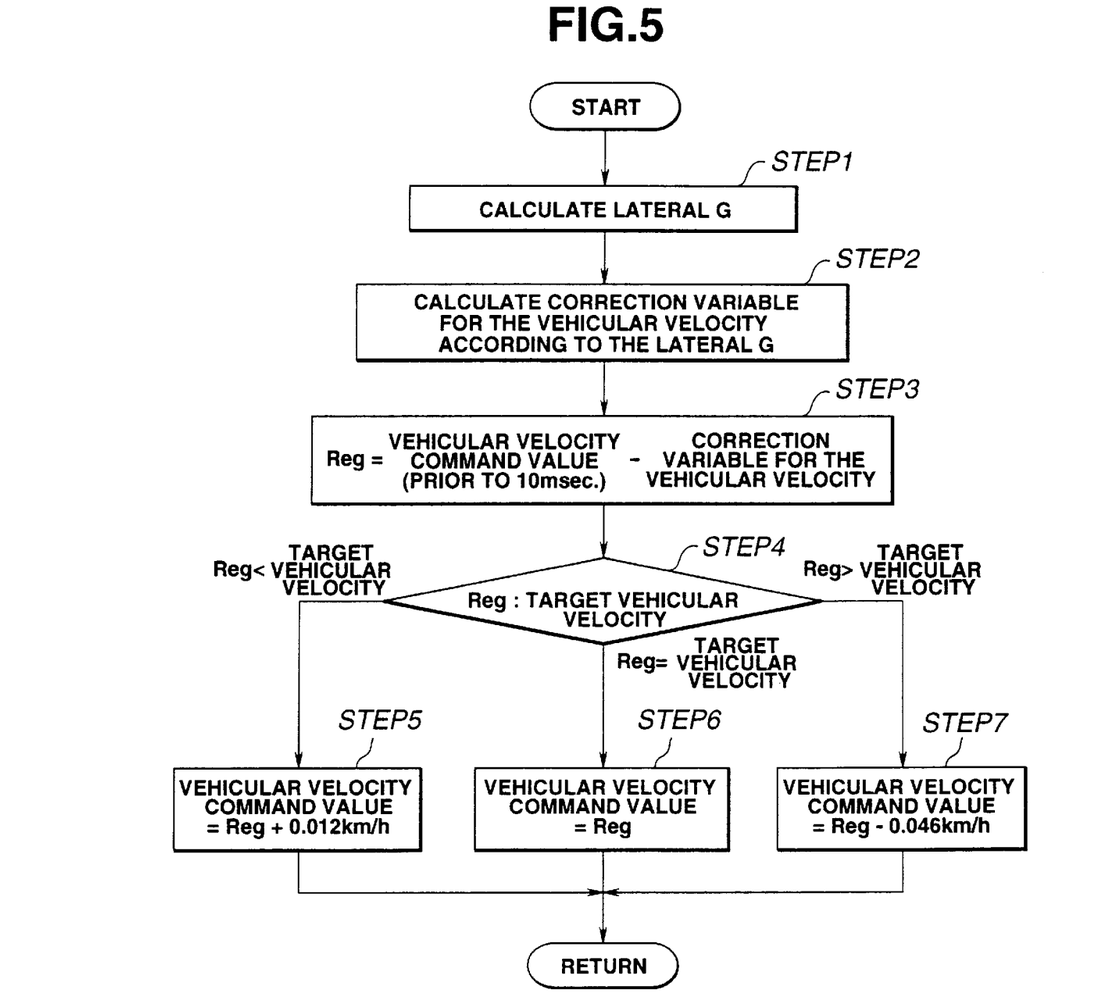
FIG. 5 is an operational flowchart for explaining the operation of the controller shown in FIG. 1A.

Next, FIG. 5 shows an operational flowchart for deriving the lateral G limited vehicular velocity command value Vsp_Comh.

The vehicular velocity controller 51 executes the calculation processing shown in FIG. 5 for each control period (in this embodiment, 10 milliseconds).

At a step step1, the CPU of the whole inter-vehicle distance controller 5 calculates the lateral acceleration (lateral G) developed on the vehicle body.

In the preferred embodiment, the CPU of the whole inter-vehicle distance controller 5 determines an approximate value of the vehicular velocity multiplied by the output value of a yaw rate (angular velocity) sensor 5h shown in FIG. 1B.

Lateral G=(vehicular velocity)* (yaw rate (angular velocity) sensor output value) - - - (9).

It is noted that the yaw angular velocity may be estimated on the basis of a steering angular displacement and a vehicular stability factor and the lateral acceleration may be calculated by multiplying the yaw angular velocity by the vehicular velocity as follows:

Lateral $G=V*V*\theta/(N*L*(1+A*V*V))$ - - - (10).

In the equation (10), V denotes a vehicular velocity, θ denotes a steering angular displacement of a steering wheel of the vehicle, N denotes a steering gear ratio, L denotes a wheel base, and A denotes a stability factor.

It is noted that a lateral G sensor (5g in FIG. 1B) may be used to directly detect the lateral acceleration (lateral G).

Next, at a step step2, the correction coefficient is derived from the table map shown in FIG. 4 to calculate the vehicular velocity correction variable Comn_Sub due to the development of the lateral G in accordance with the equation (5).

At a step step3, the CPU of the whole inter-vehicle distance controller subtracts the vehicular velocity correction variable Comn_Sub from the vehicular velocity command value Vsp_Comh before 10 ms and temporarily stores the subtraction result into a register Reg.

Reg=Vsp_Comh (prior to one control period)−Comn_Sub - - - (11).

At a step step4, the CPU of the whole inter-vehicle distance controller 5 compares the value of a register Reg with the target vehicular velocity Ac_Vcomo.

According to the cases of ①', ②', and ③', the routine shown in FIG. 5 goes selectively to any one of steps step5, step6, or step7.

If ①' Reg<Ac_Vcomo, the CPU of the inter-vehicle distance controller 5 calculates the vehicular velocity command value Vsp_Comh in accordance with the following equation (12) at the step step5.

Vsp_Comh=min{Reg +0.021 km/h (LMT(+)), Ac_Vcomo} - - - (12).

If ②' Reg=Ac_Vcomo, the CPU of the inter-vehicle distance controller 5 calculates the vehicular velocity command value Vsp_Comh in accordance with the following equation (13) at the step step6.

Vsp_Comh=Reg - - - (13).

If ①' Reg>Ac_Vcomo, the CPU of the inter-vehicle distance controller 5 calculates the vehicular velocity command value Vsp_Comh in accordance with the following equation (14) at the step7.

Vsp_Comh 32 max {Reg −0.046 Km/h (LMT(−)), Ac_Vcomo} - - - (14)

Then, the inter-vehicle distance controller 5 controls any one or more of the throttle valve position actuator 3, the automatic transmission 4, and/or braking system 6 in such a manner that the corrected vehicular velocity command value Vsp_Comh is made coincident with the actual vehicular velocity. For example, at the step step5, the vehicular velocity command value indicates the acceleration value. However, if the vehicular velocity correction variable Comn_Sub at the time at which Reg is calculated is larger than 0.021 Km/h, the vehicular velocity command value Vsp_Comh becomes smaller than the vehicular velocity command value Vsp_Comh before the control period of 10 ms. At this time, the inter-vehicle distance controller 5 commands the throttle valve position actuator 3 to close the throttle valve to decelerate the vehicle.

Figure 6A:
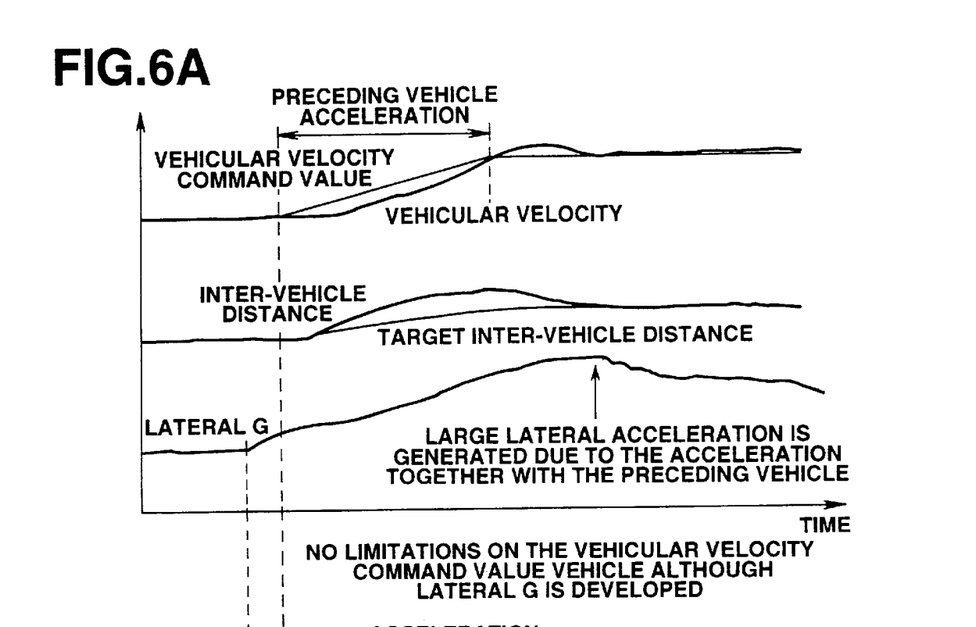
FIG. 6A and 6B are characteristic graphs representing operations when no correction is made for the target value of the vehicular velocity and the correction according to the detected value of the lateral acceleration is made for the target value of the vehicular velocity as a result of simulation in the preferred embodiment, respectively.
Figure 6B:
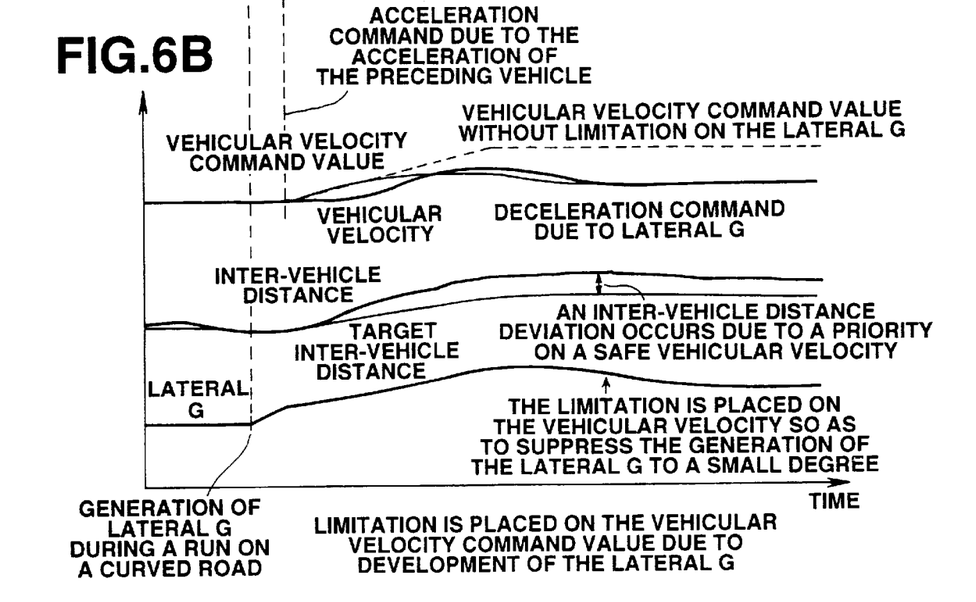

FIGS. 6A and 6B show results of control on the vehicular velocity and of the inter-vehicle distance and of the measured value of the lateral G in a case when the preceding vehicle is accelerated during the run of the vehicle on the curved road to follow up the preceding vehicle.

FIG. 6A shows a case where no correction is made for the calculated vehicular velocity command value although the development of the lateral G is imposed on the vehicle body.

FIG. 6B shows another case where the correction is made for the calculated vehicular velocity command value due to the development of the lateral G (acceleration) imposed on the vehicle body of the vehicle.

In the case where no correction is made for the vehicular velocity command value as shown in FIG. 6A, the CPU of the inter-vehicle distance controller 5 calculates the vehicular velocity command value indicating the celebration value in accordance with the acceleration of he preceding vehicle irrespective of the development in the lateral acceleration.

The vehicle is accelerated in accordance with the acceleration command. Hence, since the lateral acceleration is developed to a large degree, the vehicular occupant(s) gives an unpleasant feeling.

In the case where the correction is made for the vehicular velocity according to the development of the lateral G (acceleration) as shown in FIG. 6B, the lateral acceleration becomes large as the vehicle begins to accelerate according to the acceleration of the preceding vehicle in such a way that the increase in the vehicular velocity command value is limited in such a manner that an increase quantity is small, the increase quantity of the vehicular velocity command value is zeroed, and the increase quantity is, in turn, reduced.

Consequently, the increase in the vehicular velocity is suppressed and the development of the excessive lateral acceleration can be prevented.

That is to say, the vehicular run at a safe velocity has a higher priority that the vehicular follow-up run to the preceding vehicle. In this case, although a deviation between the target inter-vehicle distance and the actual inter-vehicle distance becomes large, the vehicular run on the curved road is ended and the development of the lateral acceleration becomes small. At this time, the vehicular velocity command value is the normal vehicular velocity command value during the vehicular run on a straight road and the vehicle is accelerated in order to eliminate the deviation in the detected value and the target value of the inter-vehicle distance.

Although FIGS. 6A and 6B show results of operations hen the preceding vehicle is accelerated during the vehicular run on the curved road, an advantage of correcting the vehicular velocity command value according to the development of the lateral G, according to the present invention, can apply equally well to a case where the vehicle is accelerated up to the set vehicular velocity limit value Vsp_Como after the preceding vehicle has disappeared from the detection zone of the inter-vehicle distance sensor 1 or can apply equally well to a case where the vehicle cruises solely at a constant vehicular velocity.

In a case where the vehicle is accelerated on the curved road with the preceding vehicle disappeared, the vehicle approaches to the preceding vehicle which has disappeared from the detection zone of the inter-vehicle distance sensor 1. Hence, in this case, the vehicular occupant(s) gives such a feeling of anxiety that, in addition to the enlarged lateral acceleration, the vehicle is too be approached to the preceding vehicle.

To prevent the vehicular occupant(s) from giving the feeling of anxiety as described above, the correction of the vehicular velocity command value according to the development of the lateral G during the follow-up run to the preceding vehicle and in a case where the preceding vehicle has disappeared from the detection zone of the inter-vehicle distance sensor 1 (the case where the preceding vehicle is present) is set earlier from a smaller lateral acceleration than the sole run of the vehicle without the preceding vehicle (the case where no preceding vehicle is present within the detection zone of the sensor 1).

Basically, in a case where the vehicle does not recognize the presence of the preceding vehicle, the inter-vehicle distance controller 5 determines that the vehicle runs solely and carries out the normally carried out correction for the target vehicular velocity according to the lateral acceleration. However, in the case where the preceding vehicle has disappeared from the detection zone during the follow-up run to the preceding vehicle on the curved road, the inter-vehicle distance controller 5 does not determine immediately the sole run of the vehicle but continuously carries out the limitation on the vehicular velocity command value beginning at the smaller lateral acceleration as if the preceding vehicle were present until the vehicular run on the curved road is ended and, thereafter, the vehicle enters a straight road.

In addition, in the case where the preceding vehicle has disappeared during the follow-up run to the preceding vehicle (the case where the preceding vehicle is present), the correction for the vehicular velocity command value according to the lateral acceleration may be carried out at an earlier time from the time at which the lateral acceleration is smaller than the time during which the vehicle runs solely without the preceding vehicle (the case where the preceding vehicle is absent from the detection zone) and the correction variable for the vehicular velocity command value may be enlarged.

Consequently, since the vehicular velocity is controlled in such a manner that the magnitude of the lateral acceleration is suppressed to be smaller, the vehicular run at the velocity to such a degree that neither the unpleasant feeling nor the feeling of anxiety is given by the vehicular occupant(s) becomes possible.

A vehicular variation actuator includes the brake system 6, the gear ratio of the automatic transmission 4, and/or the throttle valve position actuator 3.

It is noted that a determinator for determining whether the preceding vehicle is present in the detection zone of the inter-vehicle distance sensor 1 or absent from the zone is incorporated in the inter-vehicle distance controller 5.

It is noted that an actuation command includes the commands on the throttle valve angular position to the throttle valve position actuator 3 and on the gear shift to the automatic transmission 4, and on the braking liquid pressure in the brake system 6.

The entire contents of Japanese Patent Applications P10-122182 (filed May 1, 1998) are herein incorporated by reference.

Although the invention has been described above by reference to the certain embodiment of the present invention, the present invention is not limited to the embodiment described above will occur to those skilled in the art, in light of the above teachings.

The scope of the invention is defined with reference to the following claims.

TABLE 1

| | |
|---|---|
| $H(s) = (1 + \tau_c \cdot S)^{-1}$ | (a) |
| $R_1(s) = (1 + T_1 \cdot S)^{-1}$ | (b) |
| $R_2(s) = (1 + T_2 \cdot S)^{-1}$ | (c) |
| $G_v(s) = (M \cdot S)^{-1}$ | (d) |
| $\hat{F}_{or}(s) = \dfrac{R_1(s)}{G_v(s)(1 - R_1(s))}\left[\dfrac{R_2(s)}{R_1(s)}V* - V\right]$ $= \dfrac{M}{T_1}\left[\dfrac{1 + T_1 \cdot S}{1 + T_2 \cdot S}V* - V\right]$ | (e) |

TABLE 1-continued

| | |
|---|---|
| $\hat{F}_{or}(s) = \dfrac{1}{1 - H(s)}\left[F_{or}(s) - \dfrac{H(s)}{G_v(s)} \cdot V\right]$ $= \dfrac{1 + \tau_c \cdot S}{\tau_c \cdot S} \cdot F_{or}(s) - \dfrac{M}{\tau_c} \cdot V$ | (f) |
| $T_{er} = \dfrac{R_t}{G_m \cdot G_f} \cdot \hat{F}_{or}$ | (g) |
| $P_{btk} = \dfrac{-G_m \cdot G_f}{4(2 \cdot Ab \cdot Rb \cdot \mu b)}(T_{er} - T_{eo})$ | (h) |

What is claimed is:

1. A control apparatus for an automotive vehicle, comprising:
   a vehicular velocity detector detecting a vehicular velocity;
   an inter-vehicle distance detector detecting an inter-vehicle distance from the vehicle to another vehicle which is running ahead of the vehicle;
   a target vehicular velocity calculator calculating a target value of the vehicular velocity according to which a detected value of the inter-vehicle distance is made coincident with a target value of the inter-vehicle distance;
   a vehicular velocity controller, the vehicular velocity controller being responsive to the calculated target value of the vehicular velocity and generating and outputting an actuation command to control the vehicular velocity in such a manner that the detected value of the vehicular velocity is made coincident with the calculated target value of the vehicular velocity;
   a vehicular velocity variation actuator, the vehicular velocity variation actuator being responsive to the actuation command from the vehicular velocity controller, actuating the vehicle to vary the vehicular velocity so that the detected value of the vehicular velocity is made coincident with the calculated target value of the vehicular velocity;
   a lateral acceleration detector detecting a lateral acceleration imposed on a vehicle body; and
   a target vehicular velocity corrector, the target vehicular velocity corrector being responsive to a detected value of the lateral acceleration and correcting the calculated target value of the vehicular velocity according to the detected value of the lateral acceleration.

2. A control apparatus for an automotive vehicle as claimed in claim 1, wherein the target vehicular velocity corrector corrects the calculated target value of the vehicular velocity with a correction variable which becomes large as the detected value of the lateral acceleration becomes large.

3. A control apparatus for an automotive vehicle as claimed in claim 2, wherein the target vehicular velocity limiter includes: a vehicular velocity correction variable calculator calculating a correction variable of the vehicular velocity Comn_Sub as follows: Comn_Sub=(correction coefficient)*LMT(+), wherein the correction coefficient is determined according to the detected value of the lateral acceleration and LMT(+) denotes a predetermined limitation value on a vehicular acceleration; and a lateral acceleration range determinator determining into one of which ranges of magnitude the detected value of the lateral acceleration falls and wherein the correction coefficient is determined according to a result of determination by the lateral acceleration range determinator.

4. A control apparatus for an automotive vehicle as claimed in claim 3, wherein when the detected value of the lateral acceleration falls in one of the ranges which is between 0.1 G and 0.3 G, the correction coefficient is proportional to the detected value of the lateral acceleration.

5. A control apparatus for an automotive vehicle as claimed in claim 4, wherein when the detected value of the lateral acceleration falls in one of the ranges which is above 0.3 G, the correction coefficient is preset to be constant value.

6. A control apparatus for an automotive vehicle as claimed in claim 5, wherein the constant value of the correction coefficient is 2.

7. A control apparatus for an automotive vehicle as claimed in claim 4, wherein when the detected value of the lateral acceleration falls in one of the ranges which is below 0.1 G, the correction coefficient is zeroed.

8. A control apparatus for an automotive vehicle as claimed in claim 6, wherein the target vehicular velocity corrector derives the correction coefficient according to the detected value of the lateral acceleration and corrects the calculated target value of the vehicular velocity as follows: Vsp_Comh=min{Vsp_Comh (prior to one control period)−Comn_Sub+LMT(+), Ac Vcomo}, wherein Vsp_Comh denotes the corrected target value of the vehicular velocity, Ac_Vcomo is expressed as follows: Ac_Vcomo= min{Vsp_Como, Acc_Como}, wherein Vsp_Como denotes a set vehicular velocity upper limit value and Acc_Como denotes the calculated target value of the vehicular velocity by the target vehicular velocity calculator, when Vsp_Comh (prior to one control period)<Ac_Vcomo.

9. A control apparatus for an automotive vehicle as claimed in claim 8, wherein when Vsp_Comh (prior to one control period)=Ac_Vcomo, Vsp_Comh=Vsp_Comh (prior to one control period)−Comn_Sub.

10. A control apparatus for an automotive vehicle as claimed in claim 8, wherein when Vsp_Comh (prior to one control period)>Ac_Vcomo, Vsp_Comh=max{Vsp_Comh (prior to one control period)−Comn_Sub−LMT(−), Ac_Vcomo}, wherein LMT(−) denotes a predetermined limitation value on a vehicular deceleration.

11. A control apparatus for an automotive vehicle as claimed in claim 10, wherein LMT(−) is 0.046 Km/h.

12. A control apparatus for an automotive vehicle as claimed in claim 8, wherein LMT(+) is 0.021 Km/h.

13. A control apparatus for an automotive vehicle as claimed in claim 1, further comprising a determinator determining whether the another vehicle has disappeared from a detection zone of the inter-vehicle distance detector from the detected value of the inter-vehicle distance by the inter-vehicle distance detector and wherein the target vehicular velocity corrector still continues the correction of the calculated value of the vehicular velocity when the determinator determines that the another vehicle has disappeared from the detection zone of the inter-vehicle distance detector.

14. A control apparatus for an automotive vehicle as claimed in claim 1, further comprising a determinator determining whether the another vehicle is present within a detection zone of the inter-vehicle distance detector and wherein the target vehicular velocity corrector corrects the calculated target value of the vehicular velocity with a correction variable which is changed according to a result of determination by the determinator.

15. A control apparatus for an automotive vehicle as claimed in claim 4, wherein the target vehicular velocity corrector corrects the calculated target value of the vehicular velocity with the correction variable which is larger in a case where the determinator determines that the another vehicle is present within the detection zone than that in a case where the determinator determines that the another vehicle is absent from the detection zone.

16. A control apparatus for an automotive vehicle as claimed in claim 1, wherein the vehicular velocity variation actuator includes a throttle valve position actuator to open and close a throttle valve of a vehicular engine and a brake system to control a braking force applied to the vehicle.

17. A control apparatus for an automotive vehicle, comprising:
vehicular velocity detecting means for detecting a vehicular velocity;
inter-vehicle distance detecting means for detecting an inter-vehicle distance from the vehicle to another vehicle which is running ahead of the vehicle;
lateral acceleration detecting means for detecting a lateral acceleration imposed on a vehicle body;
vehicular velocity variation actuating means for actuating the vehicle to vary the vehicular velocity; and
controlling means for calculating a target value of the inter-vehicle distance on the basis of detected values of the vehicular velocity and of the inter-vehicle distance, for calculating a target value of the vehicular velocity according to which the detected value of the inter-vehicle distance is made coincident with the target value of the inter-vehicle distance, for correcting the calculated target value of the vehicular velocity according to a detected value of the lateral acceleration, and for generating and outputting an actuation command to the vehicular velocity variation actuating means to vary the vehicular velocity in accordance with the corrected target value of the vehicular velocity.

18. A method for controlling a vehicular velocity for an automotive vehicle, comprising:
detecting a vehicular velocity;
detecting an inter-vehicle distance from the vehicle to another vehicle which is running ahead of the vehicle;
detecting a lateral acceleration imposed on a vehicle body of the vehicle;
calculating a target vehicular velocity of the vehicle according to which a detected value of the inter-vehicle distance is made coincident with a target value of the inter-vehicle distance;
correcting the calculated target value of the vehicular velocity according to a detected value of the lateral acceleration;
controlling the vehicular velocity of the vehicle in such a manner that the detected value of the vehicular velocity is made coincident with the corrected target value of the vehicular velocity;
generating an actuation command, the actuation command being responded to the corrected target value of the vehicular velocity; and
actuating the vehicle to vary the vehicular velocity to make the detected value of the vehicular velocity coincident with the corrected target value of the vehicular velocity.

* * * * *